US011313252B2

(12) United States Patent
Rechtman

(10) Patent No.: US 11,313,252 B2
(45) Date of Patent: Apr. 26, 2022

(54) ENHANCED HRSG FOR REPOWERING A COAL-FIRED ELECTRICAL GENERATING PLANT

(71) Applicant: Nooter/Eriksen, Inc., Fenton, MO (US)

(72) Inventor: Yuri M. Rechtman, Chesterfield, MO (US)

(73) Assignee: NOOTER/ERIKSEN, INC., Fenton, MO (US)

( * ) Notice: Subject to any disclaimer, the term of this patent is extended or adjusted under 35 U.S.C. 154(b) by 202 days.

(21) Appl. No.: 16/570,019

(22) Filed: Sep. 13, 2019

(65) Prior Publication Data

US 2020/0102857 A1 Apr. 2, 2020

Related U.S. Application Data

(60) Provisional application No. 62/740,294, filed on Oct. 2, 2018.

(51) Int. Cl.
| | |
|---|---|
| *F01K 23/10* | (2006.01) |
| *F01K 7/32* | (2006.01) |
| *F01K 13/00* | (2006.01) |
| *F01K 9/00* | (2006.01) |

(52) U.S. Cl.
CPC .............. *F01K 23/10* (2013.01); *F01K 7/32* (2013.01); *F01K 9/00* (2013.01); *F01K 13/006* (2013.01)

(58) Field of Classification Search
CPC .......... F01K 23/10; F01K 7/32; F01K 13/006; F01K 9/00; Y02E 20/16
USPC ............................... 60/39.182, 653, 677–680
See application file for complete search history.

(56) References Cited

U.S. PATENT DOCUMENTS

| 5,442,908 A * | 8/1995 | Briesch ................. F01K 23/106 60/39.182 |
|---|---|---|
| 6,223,519 B1 * | 5/2001 | Basu ........................ F01K 23/10 60/783 |
| 6,339,926 B1 * | 1/2002 | Ichiro .................... F01K 23/108 60/39.182 |
| 6,508,206 B1 | 1/2003 | Rechtman |
| 9,581,328 B2 | 2/2017 | Schroeder et al. |
| 2011/0140453 A1 * | 6/2011 | Shortlidge .............. F01D 15/10 290/1 A |
| 2018/0216496 A1 * | 8/2018 | Smith ..................... F01K 13/02 |
| 2018/0371956 A1 * | 12/2018 | Selman ..................... F02C 6/18 |

* cited by examiner

*Primary Examiner* — Hoang M Nguyen
(74) *Attorney, Agent, or Firm* — Sandberg Phoenix & von Gontard P.C.

(57) ABSTRACT

A system for repowering a coal fired electrical generation plant with natural gas is disclosed. The plant has having high and low pressure steam turbines that drives an electrical generator. The coal fired plant has a regenerative system comprising a plurality of feedwater heaters that supply heated feedwater to evaporators and superheaters that supply steam to the turbines. The repowering system has a gas turbine that drives a second electrical generator where the HRSG is configured to receive the exhaust from the gas turbine and which is heated by a burner so as to generate steam for driving the steam turbines. The feedwater heaters utilize condensate from the said and from steam extractions to supply heated feedwater to the superheaters that feed superheated steam to turbines such that the first generator driven by the turbines is driven at a high percentage of its rated megawatt output.

4 Claims, 3 Drawing Sheets

Enhanced Repowering

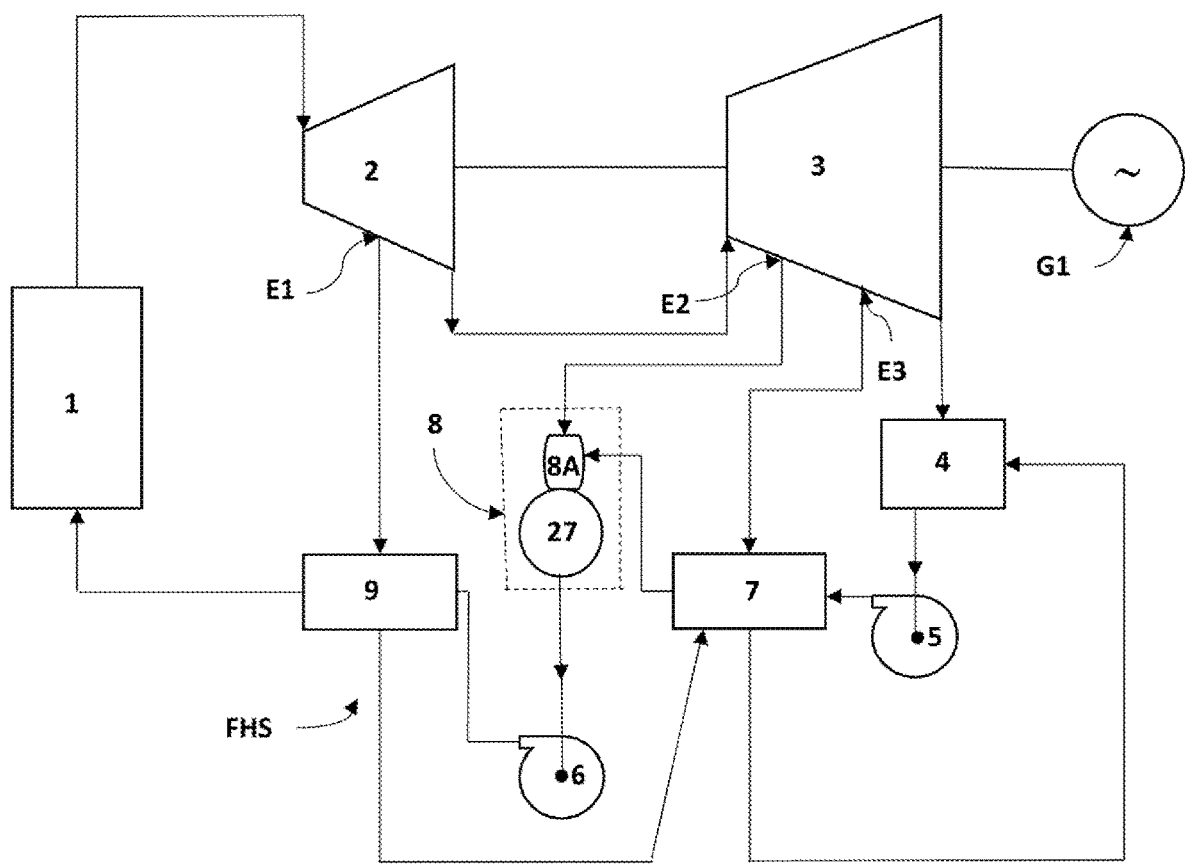
Fig. 1 Conventional Coal Plant (Simplified)

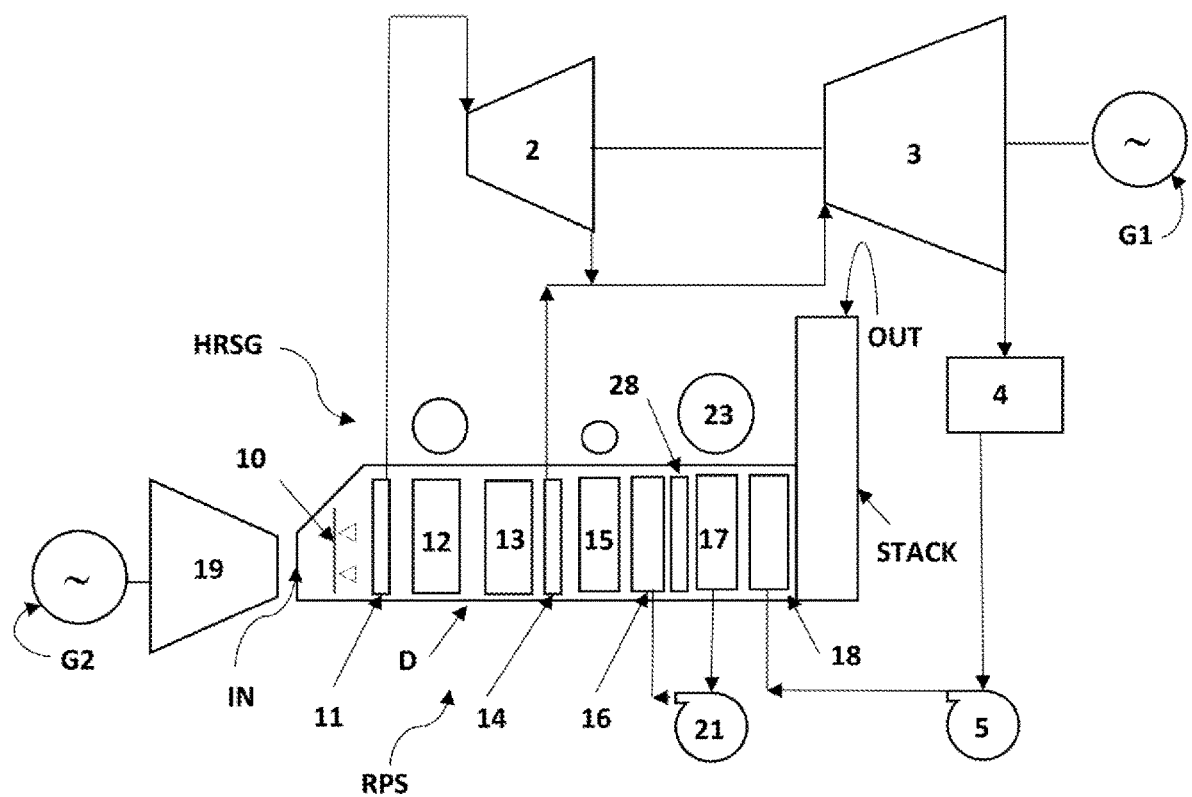
Fig. 2 State of the Art Repowering

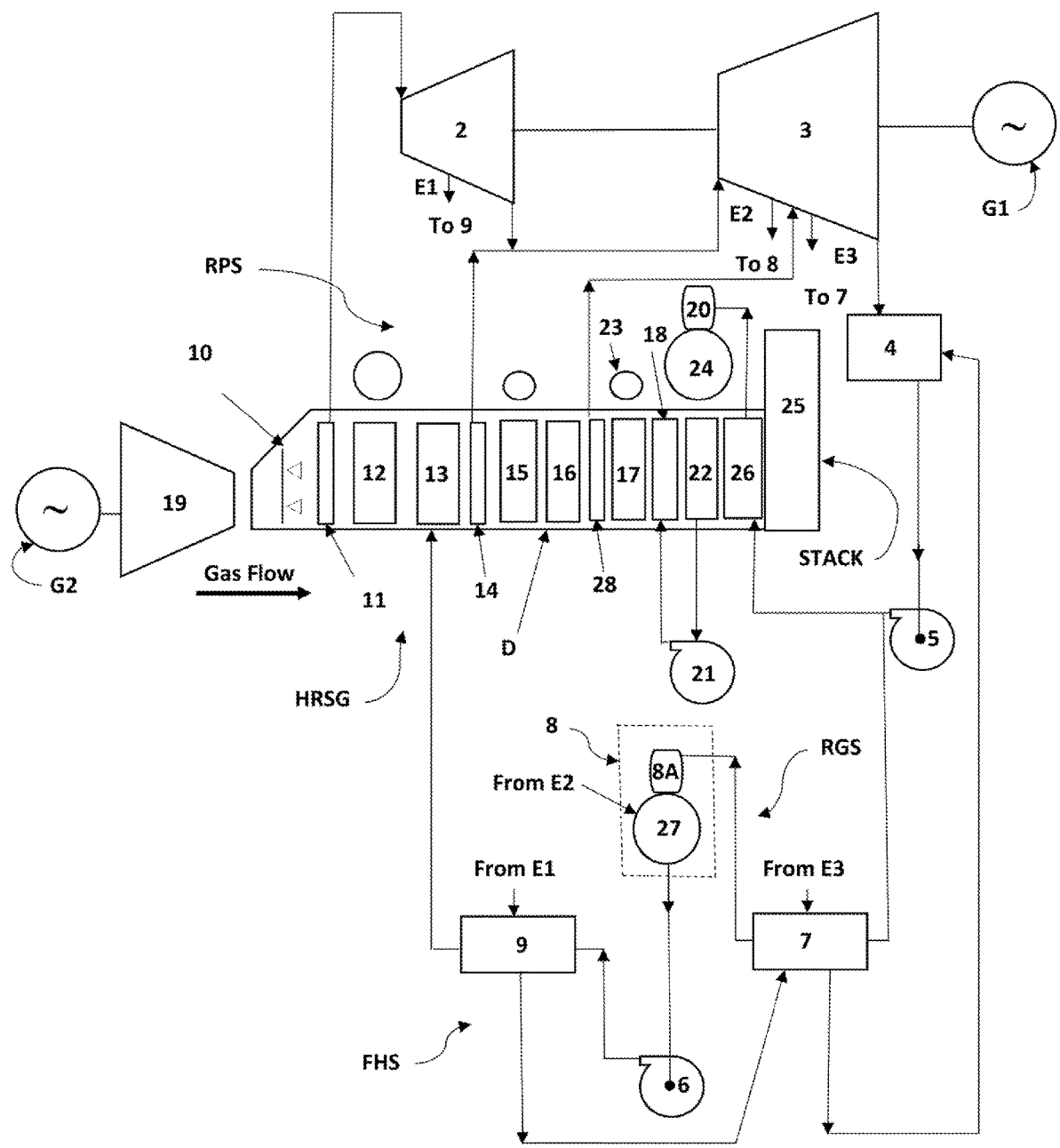
Figure 3 Enhanced Repowering

ENHANCED HRSG FOR REPOWERING A COAL-FIRED ELECTRICAL GENERATING PLANT

CROSS-REFERENCE TO RELATED APPLICATIONS

This application claims the benefit of U.S. Provisional Application No. 62/740,294, filed Oct. 2, 2018, which U.S. provisional application is incorporated herein by reference.

STATEMENT REGARDING FEDERALLY SPONSORED RESEARCH OR DEVELOPMENT

Not Applicable.

BACKGROUND OF THE DISCLOSURE

Strict emission regulations are making it difficult to continue operation of many existing coal fired power plants. Renewable energy sources, such as wind, solar, and natural gas-fired power generation are replacing many coal fired electrical power generating plants or systems. Natural gas fired power generation is substantially cleaner for the environment than coal fired power generation. Numerous transitional technologies have been introduced to repower a coal fired plant. Generally, in such repowering situations, the entire coal fired plant equipment, except for the steam turbines, is replaced with a combined cycle power plant that utilizes a gas turbine and a Heat Recovery Steam Generator (HRSG) system.

Some existing coal fired power plants, such as illustrated in FIG. 1, have relatively new steam turbines that have ten to fifteen years of operating life remaining in their life cycle. Keeping the steam turbines and replacing the coal fired boiler with a combined cycle arrangement is a typical solution to save the cost of the initial investment in a new steam turbine. In such repowering situations, the regenerative cycle of the coal-fired system is removed and the steam turbine extractions of the coal fired system used for feedwater preheating are plugged. However, such an arrangement reduces the steam turbine generator power production due to condenser capacity limitation.

Referring now to FIG. 1 of the instant application, a simplified schematic of a typical prior art coal fired electrical generating plant is shown. There, a coal fired boiler 1 is supplied with high temperature feedwater by a feedwater heating system, as generally indicated at FHS, such that the coal fired boiler 1 generates high pressure superheated steam in the conventional manner so as to power a high pressure steam turbine 2, which is typically an extracting type turbine, having at least one extraction E1. A low pressure steam turbine 3 is coupled to the output shaft of the high pressure steam turbine 1 such that both turbines drive an electrical generator G1. More particularly, it is seen in FIG. 1 that intermediate pressure steam exhausted from the high pressure turbine 2 is supplied to the first stage of the low pressure steam turbine 3. Low pressure steam exhausted from the last stage of the low pressure turbine 3 is condensed in a condenser 4, and the resulting condensate is supplied to a condensate pump 5 of the feedwater heating system FHS to supply condensate feedwater to a first feedwater heater 7. The low pressure turbine 3 may be a condensing type turbine, where steam is extracted from various stages of the low pressure turbine by one or more extractions E2, E3 (also known as extraction points or extraction valves) to be sent to respective second and third feedwater heaters of the feedwater heating system FHS to improve overall cycle efficiency.

Feedwater heaters 7 and 9 are heat exchangers designed to preheat boiler feedwater by means of condensing steam extracted (or "bled") from the high and low pressure steam turbines 2 and 3. The second feedwater heater 8 (as shown in dotted lines in FIG. 1) is comprised of a deaerator 8A to which steam from extraction E2 is supplied, which, in turn, supplies deaerated liquid water to a steam drum 27 where the deaerated water is heated and is supplied to feedwater heater 9 by means of a pump 6. Normally, as shown in FIG. 1, there are multiple stages of feedwater heating. Each stage corresponds to a turbine extraction E1-E3, as shown in FIG. 1. These extraction points occur at various stages of the expansion of steam through the high and low pressure turbines 2 and 3.

The presence of the feedwater heaters 7, 8 and 9 heated by steam from the extractions in the cycle enhances the thermal efficiency of the powerplant; the greater the number of extractions, the lower the amount of thermal energy that must be added to the system is required to generate a given amount of electrical energy. The third feedwater heater 9 is supplied heated feedwater by a high pressure feedwater pump 6 from feedwater heaters 7 and 8, and the feedwater heater 9 supplies high temperature feedwater to boiler 1. More particularly, and as shown in FIG. 1, the deaerated feedwater from feedwater heater 8 is forced by feedwater pump 6 at high pressure into feedwater heater 9 where it is further heated by steam from extraction E1 and then is supplied to boiler 1 where it is converted to steam and is superheated so that high pressure, superheated steam is supplied to the inlet of the high pressure turbine 2. Intermediate pressure steam is fed from the last stage of the high pressure turbine 2 to the inlet of low pressure turbine 3. As noted above, part of the steam entering the low pressure turbine 3 exits through extractions E2 and E3 and is supplied to feedwater heaters 8 and 7, as shown in FIG. 1. The remaining steam exits the low pressure turbine 3 and is exhausted into a condenser 4 where it is condensed and fed as condensate to feedwater heater 7 by a condensate pump 5. Generally, such steam turbines are limited by the condenser 4 throughput.

Referring now to FIG. 2, a typical prior art (state of the art) repowering system for a coal fired plant, as shown in FIG. 1, is indicated in its entirety at RPS. This repowering system is shown to include a combustion gas turbine 19, which typically burns natural gas and which drives an electrical generator G2. The repowering system reuses the high pressure and low pressure steam turbines 2 and 3 from the coal fired system that is being repowered by the repowering system RPS to drive generator G1 of the coal-fired plant. The steam for the high and low pressure steam turbines 2 and 3 is generated by a heat recovery steam generator, as generally indicated at HRSG, that is heated in part by the exhaust from the gas turbine 19 and in part by a supplemental gas burner 10, as shown in FIG. 2. However, in converting the high and low pressure turbines 2 and 3 of the coal fired system that is to be repowered for use in the repowered system of FIG. 2, the extractions E1, E2 and E3 in the turbines 2 and 3, as shown in FIG. 1, are plugged or otherwise rendered inoperable, and the feedwater heating system FHS of FIG. 1 is not used.

More specifically, as shown in FIG. 2, the exhaust from gas turbine 19 is supplied to heat recovery steam system HRSG, which includes a duct or housing D having an upstream end IN and a downstream end OUT, where the exhaust stream flows through the duct D from the inlet IN to the outlet OUT until the spent exhaust is discharged to the atmosphere via a stack. The above mentioned supplemental burner 10 is typically positioned at the upstream end of the duct D to further heat the exhaust from the gas turbine 19. Immediately downstream of the supplemental burner 10 is a high pressure superheater 11, which supplies high pressure, superheated steam to the inlet of the high pressure turbine 2 of the coal fired system that is being repowered.

In a typical conventional repowering system RPS, such as shown in FIG. 2, the high and low pressure steam turbines 2 and 3 may be extraction-type turbines having a plurality of extractions, as generally indicated at E1, E2, E3 of FIG. 1. However, as noted above, when the steam turbines 2 and 3 are used in a repowered system RPS, as shown in FIG. 2, such extractions are plugged and are inoperable, and the feedwater reheating system FHS, including feedwater heaters 7-9 of FIG. 1, is not used. As a result, the steam turbines 2 and 3 of such prior art repowered systems are unable to receive the same amount steam as in the coal fired system of FIG. 1. This limits the megawatt output of steam turbine generator G1 to about half of its output when operated in the coal fired system of FIG. 1.

Referring now to FIG. 2, a typical prior art HRSG used in a prior art repowering system RPS will be more particularly described. In its most basic form, the repowering system includes a gas turbine 19 that drives an electrical generator G2 coupled to the output shaft of the gas turbine. The exhaust from the gas-fired turbine is supplied to a HRSG, where it may be further heated by supplemental burner 10. Steam from the HRSG drives the high and low pressure steam turbines 2 and 3 of the coal fired plant being repowered to run on natural gas. A succession of heat exchangers, namely superheaters 11 and 14, evaporators 12, 15, and 17, economizers 13 and 16, and a feedwater heater 18 are serially arranged in the order shown in FIG. 2 within the casing or duct D between the inlet IN and the outlet OUT of the duct. Feedwater enters the components of the HRSG at feedwater heater 18 by means of a condensate pump 5, which supplies condensate from condenser 4 to the feedwater heater 18, which heats the incoming condensate feedwater. The warmed water from feedwater heater 18 flows into a low pressure (LP) evaporator 17, which includes a low pressure steam drum 23. The low pressure steam drum 23 acts as a phase-separator for the saturated steam/saturated water mixture within the steam drum 23, where the water is supplied to a feedwater pump 21 that, in turn, delivers the feedwater to a high pressure (HP) economizer 13 and to an intermediate pressure (IP) economizer 16. Water from the HP economizer 13 and the IP economizer 16 enters their respective high pressure and intermediate pressure evaporators 12 and 15 where it is converted to saturated steam. Of course, additional heat is added in the evaporators 12 and 15. This saturated steam then flows to respective superheaters 11 and 14, which further heat and convert the saturated steam to superheated steam. Superheated steam from superheater 11 is supplied to the inlet of the HP steam turbine 2, and superheated steam from the intermediate pressure superheater 14 is supplied to the inlet of the LP steam turbine 3, as shown in FIG. 2.

However, such a prior art repowering system RPS, as shown in FIG. 2, does not take advantage of the regenerative heating system (i.e., the extractions E1-E3 in the steam turbines and the feedwater heating system FHS) of the coal fired plant that is being repowered. In FIG. 1, this regenerative heating system is shown to comprise extractions E1, E2 and E3 and feedwater heaters 7, 8, and 9. As a result, the megawatt output of the generator G1 driven by the steam generators 2 and 3 of the coal fired plant in a typical repowering system RPS, as shown in FIG. 2, may be limited to about one half (or less) to its megawatt output when used in the coal fired system shown in FIG. 1.

In accordance with the present disclosure, a repowered system RPS of the present disclosure takes advantage of the regenerative cycle of the coal fired plant and thus increases the overall efficiency to the repowered system. In a repowered system RPS of the present disclosure, not only are the high and low pressure steam turbines 2 and 3 of the coal fired system used in the repowered system, but also the extractions E1-E3 and the feedwater heaters 7, 8, and 9 are utilized in the new arrangement of the present disclosure so as to achieve a higher overall thermal efficiency for the repowered system RPS.

SUMMARY OF THE PRESENT DISCLOSURE

Supplementary gas-fired systems have been proposed to generate additional steam to keep regenerative cycle of the coal fired system in place. However, the present disclosure includes additional components in the repowering system that allow the regenerative cycle of the coal fired plant to also be used in the repowered system. The present novel system has the advantages listed in [0015]-[0023], below.

Among the several objects and features of the repowering system RPS of the present disclosure is that a reduced size HRSG may be used. Additionally, the front (or high pressure) system of the HRSG of the present disclosure is configured to be fired by a supplemental burner and sized for fired operation, while the back of the subject HRSG is designed for the unfired operation with the existing plant feedwater heaters undertaking the load during fired operation. The existing feedwater heater heating system FHS from the coal fired plant system is utilized to make the cost of the subject HRSG lower than the cost of a traditional HRSG, and yet to result in improved operating efficiency.

A repowering system of the present disclosure results in superior operating flexibility due to turndown capability, unlike current add-on systems.

With a repowered plant in accordance of the present disclosure, plant efficiency is brought up to current standards by the HRSG of the present disclosure, which has an additional pressure level for deaeration (22) during a non-regenerative cycle operation with interaction with a deaerator (8A) during the regenerative mode of operation.

An additional advantage of the improved HRSG of the present disclosure is that it can operate in a traditional combined cycle mode until the steam turbines from the coal-fired plant reach the end of their service lives and need to be replaced, such that only minor modifications need be made to the HRSG by strategically adding one or two coils to such an HRSG after it is installed, rather than discarding the entire HRSG designed for repowering when new steam turbines are added to the repowering system.

The HRSG of the present disclosure utilizes the regenerative system of the coal-fired system that is being repowered, including the extractions in the steam turbines and the feedwater heaters of the coal-fired system such that the steam turbines from the coal-fired plant can operate at their fully rated generating capacity enabling the repowered system to operate at full load.

A larger gas turbine/HRSG block of the present disclosure is designed to generate the required steam production for regenerative mode of operation with economizer bypasses for the operation without the feedwater heaters in service.

The provision of such a system that has a turndown ratio that is unlimited, that is, the system will operate reliably throughout the entire load range of the combustion turbine with supplemental firing of the duct or supplemental burner.

A system of the present disclosure is intended for repowering a coal fired electrical generation plant to run on natural gas. The coal fired generation plant has a high pressure steam turbine, a low pressure steam turbine, an electrical generator driven by the high and low pressure steam turbines, and a regeneration system including a plurality of feedwater heaters. More particularly, referring to FIG. 3, state of the art conventional repowering systems typically have the following:

A gas turbine 19 driving an electrical generator G2;
A duct D receiving the hot exhaust gas from the gas turbine 19;
A supplemental gas fired burner 10 in the inlet of duct D;
A high pressure superheater 11;
A high pressure evaporator 12;
A high pressure economizer 13;
An intermediate pressure superheater 14;
An intermediate pressure evaporator 15;
A high pressure/intermediate economizer 16;
A low pressure evaporator 17;
A high pressure, intermediate pressure, low pressure economizer 18 receives feedwater from the steam drum 24 of the deaerator evaporator 22.

More specifically, the improved repowering system RPS of the present disclosure that increases the efficiency of the above described state of the art repowered system further comprises:

Reuse of the regenerative system RGS of the coal fired plant including feedwater heaters 7, 8 and 9, where feedwater heater 7 is supplied steam from one or more extractions of the low pressure turbine 3, where feedwater heater 9 is supplied steam from an extraction of the high pressure turbine 2, where the feedwater heater 8 has a deaerator/steam drum 27 which receives steam from low pressure turbine 3, and where feedwater heater 9 supplies heated feedwater to the high pressure economizer 13;
A feedwater heater 26 receives condensate from a condenser 4 that, in turn, receives exhaust from the low pressure outlet of the low pressure turbine 3;
A deaerator 20 for removing oxygen and other dissolved gases in the feedwater;
A low pressure superheater 28 supplies low pressure steam to said low pressure turbine 3; and
A deaerator evaporator 22 that supplies steam for deaeration.

Other objects and features of the repowering system of the present disclosure will be in part apparent and in part disclosed hereinafter.

BRIEF DESCRIPTION OF THE DRAWINGS

FIG. 1 is a simplified schematic view of a prior art conventional coal fired power plant wherein a coal fired boiler 1 feeds high and low pressure steam turbines 2 and 3, where feedwater heaters 7, 8, and 9 are, respectively, fed by steam turbine extractions E3, E2, and E1, respectively, to heat the feedwater heaters 7, 8 and 9, respectively, of the feedwater heating system FHS;

FIG. 2 is a simplified schematic view of a prior art (or current state of the art) repowering system, where coal fired boiler 1 shown in FIG. 1 is replaced by a conventional CTG/HRSG block comprising a combustion gas turbine generator set including a gas turbine 19, and a generator G2 directly driven by the turbine. This repowering system includes a heat recovery steam generator HRSG that powers the high and low pressure steam turbines 2 and 3 of the repowered system that drive the generator G1 of the coal fired system that is being repowered; and FIG. 3 is a schematic view of an enhanced system of the present disclosure for repowering a coal burning power plant, such as shown in FIG. 1, that advantageously incorporates a modified combustion gas turbine/heat recovery steam generator (CTG/HRSG) block that utilizes the steam turbine extractions and the regeneration system of the coal-fired plant being repowered including the feedwater heaters 7-9, as shown in FIG. 1, along with certain additional components to fully utilize the regeneration system of the coal fired plant, thus resulting in improved overall thermal efficiency for the repowered plant or system.

Corresponding reference characters indicate corresponding parts throughout the several views of the drawings.

DETAILED DESCRIPTION OF PREFERRED EMBODIMENTS OF THE SYSTEM AND METHOD OF THE PRESENT DISCLOSURE

The following detailed description illustrates the claimed invention by way of example and not by way of limitation. The description enables one of ordinary skill in the relevant art to which this disclosure pertains to make and use the disclosure. This detailed description describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Referring now to FIG. 3, it will be noted that the repowering system RPS of the present disclosure utilizes an enhanced heat recovery steam generator HRSG that utilizes not only the high and low pressure steam turbines 2 and 3 of the coal fired plant, as shown in FIG. 1, that is being repowered, but it also utilizes the regeneration system RGS of the coal fired plant including the feedwater heater system FHS and the extractions E1, E2, E3 of the coal fired plant which improve the overall efficiency of the repowered system, as compared to prior art repowering systems, as shown in FIG. 2. As shown in FIG. 3, the repowering system RPS has a natural gas combustion turbine 19 that drives a generator G2, where the exhaust from the gas turbine supplies heat to a heat recovery steam generator HRSG, which in turn, supplies steam to the high pressure and low pressure steam turbines 2 and 3 that were part of the existing equipment of a coal fired power plant, such as illustrated in FIG. 1. Of course, the steam turbines 2 and 3 drive the electrical generator G1 from the coal fired plant, as shown in FIGS. 1 and 3. The gas turbine 19 discharges its hot exhaust gas into the duct D of the HRSG, which extracts heat from the exhaust gas to produce steam, and adds additional heat via supplemental burner 10 and recovers heat from the extractions E1-E3 of the high and low pressure steam turbines 2 and 3 to power the high and low pressure steam turbines 2 and 3 from the coal fired plant that is being repowered. Additional heat recovery from the existing plant feedwater heaters 7, 8, and 9 via steam turbine extractions E1-E3 complete the process loop. In this manner, the megawatt output of the generator G1 of repowered system is maximized and can equal or even exceed the megawatt output of the coal fired system.

As noted, the HRSG system shown in FIG. 3 utilizes the exhaust energy of gas turbine 19 to produce steam. The HRSG of FIG. 3 further uses the supplemental burner 10, the high pressure (HP) superheater 11, the HP evaporator 12, the HP economizer 13, the intermediate (IP) superheater 14, the IP evaporator 15, the HP/IP economizer 16, the LP evaporator 17, and the HP/IP/LP economizer 18 from the repowering system, as shown in FIG. 2. However, in accord with the present disclosure, certain additional components, such as a deaerator (DA) evaporator 22, a feedwater heater 26, and the regeneration system RGS including feedwater heaters 7-9 of the coal fired system, are utilized to enhance the output of the repowered system above the output of a repowered system, such as shown in FIG. 2.

Certain repowering options exist, which include removal of the existing equipment followed by replacement with the new equipment, and partial removal of existing components.

As shown in FIG. 2, conventional wisdom for repowering a coal fired plant prior to the present disclosure, as shown in FIG. 1, uses a new gas turbine 19 in combination with an HRSG. However, in the existing high and low pressure steam turbines 2 and 3 of the coal fired system, the extractions for these turbines are isolated or plugged, so that the steam turbines 2 and 3 must operate at part load for the remainder of their life cycle, which means that the megawatt output of the turbines 2 and 3 is a fraction (e.g., typically about half) of their output in the coal fired system.

The approach to repowering of the present disclosure, as shown in FIG. 3, is quite different because it involves the reuse of more power plant equipment from the system being repowered, as shown in FIG. 1, in addition to the steam turbines 2 and 3. Steam turbine extractions E1, E2 and E3, as shown in FIG. 1, remain open and the feedwater heaters 7, 8, and 9 are functional such that the overall efficiency of the repowered system is significantly greater.

Normal operation of the system shown in FIG. 3 is described as follows:

Combustion turbine 19 and its generator G2 are operating at 100% load generating full power.

The HRSG and its supplemental burner 11, as shown in FIG. 3, are producing steam at several pressure levels with the supplemental burner producing additional steam such that the existing plant extractions and feedwater heaters, as shown in FIG. 3, can be used. This allows the existing steam turbines 2 and 3 to generate electricity at the full rated megawatt output of these turbines thus increasing the overall efficiency of the repowered system RPS.

Steam is fed into the steam turbine generators 2 and 3 for full power generation from generator G1 of the repowered system RPS.

Condensate is collected in the condenser 4 and returned to the HRSG.

Only one parallel circuit is running at full combustion turbine load in normal system operation. The condensate pump 5 of the coal fired system of FIG. 1 may be utilized where the condensate flow is split into two parallel circuits so that the pump 5 will feed the new feedwater heater 26 (as shown in FIG. 3) and the existing feedwater heater 7.

Almost no steam is fed through the steam turbine extractions E1, E2, E3 that supply steam to external feedwater heaters 7, 8, and 9, as shown in FIG. 3. The required deaeration occurs in the integral deaerator 24, as shown in FIG. 3. Steam for deaeration is supplied by the dedicated deaerator evaporator 22. Suction of the new feedwater pump 21 is taken from the new integral deaerator 24. Feedwater is supplied to all the pressure levels and superheated steam from HP, IP, and LP superheaters 11, 14, and 28, respectively, is fed to the steam turbines 2 and 3.

Utilization of the integral deaerator 24 with the dedicated deaerated evaporator 22 is a major element of this disclosure. Almost no steam is supplied to the existing deaerator 8A, so no deaeration can occur there. In prior art repowering systems, such as shown in FIG. 2, the existing steam turbines 2 and 3 are limited by the capacity of condenser 4. This limitation is the reason why steam turbines 2 and 3 and their associated generator G1, as shown in FIG. 2, produce only about half of the rated megawatt capacity in a conventional repowering application. The system of the present disclosure supplies sufficient steam to turbines 2 and 3 to allow generator G1 driven by these turbines to produce a much larger percentage of its rated capacity up to its full rated capacity.

A second parallel circuit comprising the condenser 4 and existing condensate pump 5 is initiated with the firing of supplemental burner 10. Steam turbines 2 and 3 and their extractions E1, E2, E3 are open to supply steam to existing external feedwater heaters 7, 8, and 9. The capacity of condenser 4 is not a hindrance in this mode of operation since the steam turbine extractions handle the extra steam produced in the HRSG. The existing feedwater pump 6, as shown in FIG. 3, takes suction from the existing deaerator 8A, and feedwater is supplied to the last stage of the economizer 13. The additional steam produced in such an arrangement allows the steam turbine generator to run at full capacity.

There is an extra benefit of the system of this disclosure in that the cost of the HRSG is reduced because existing feedwater heaters 7, 8, and 9 replace the surface that is required in a conventional supplementary fired HRSG.

Provisions for conversion to the conventional combined cycle power plant can be added to the HRSG to make a cost effective transition when the existing steam turbines 2 and 3 are at the end of their life cycles.

In the repowering system RPS of the present disclosure, steam turbine 3 discharges steam from its last stage at a relatively low temperature and pressure into a condenser 4, where it is condensed into liquid water. Service water supplied to the condenser for cooling brings the pressure in the condenser below atmospheric or at a vacuum. The condenser 4 is connected to a condensate pump 5 that feeds condensate to a feedwater heater 26 located in the downstream end portion of the upstream of the stack 25.

Water from condenser 4 can also flow through a conduit to condensate pump 5, which can be part of the existing equipment of the power plant, as shown in FIG. 1. Also illustrated in FIG. 3 are three feedwater heaters 7, 8 and 9 that were previously used in the system of FIG. 1 that is being repowered. Condensate in liquid form flows via a conduit from pump 5 into a first feedwater heater 7. In addition, steam extracted from the low pressure turbine 3 via extraction E3 is directed into the first feedwater heater 7, as shown in FIG. 3, to heat the feedwater in feedwater heater 7. Of course, feedwater heater 7 heats the feedwater flowing therethrough and directs the heated feedwater into a combination steam drum/deaerator 8A/27 previously utilized in the coal fired system of FIG. 1. The steam drum/deaerator 27 also receives steam from extraction E2 in the low pressure turbine 3. The steam drum/deaerator 8A/27 is in liquid flow communication with the feedwater heater 9 to supply feedwater from the steam drum/deaerator 8A/27. More specifically, water supplied from the feedwater heater 7 is heated in the deaerator 8A and is delivered to steam drum 27, where the liquid water is heated by a heater within the steam drum (not shown in FIG. 3, but well known to those skilled in the art). Steam drum 27 is in liquid flow communication with steam from turbine 3 via extraction E2. As shown in FIG. 3, the deaerator storage tank 27 has a deaerating heater 8A located on top of it. Heated feedwater is drawn from deaerator storage tank 27 by pump 6, which, in turn, introduces this heated feedwater into feedwater heater 9. Feedwater heater 9 also receives condensate from extraction E1 of the high pressure steam turbine 2. It will be understood that, while not shown in FIG. 1, pump 6 may be a part of the coal fired unit of FIG. 1 that is being repowered. Water from feedwater heater 9 is discharged into a high pressure (HP) economizer 13.

The flow connections from the economizer 13 to the high pressure evaporator 12 and to the superheater 11 are substantially the same as described in the said U.S. Pat. Nos. 6,508,206 and 9,581,328, which patents are herein incorporated by reference in their entirety. It can thus be seen that second parallel circuit comprising the condenser 4, the existing condensate pump 5 is initiated with the available supplemental firing of burner 10. Steam turbine extractions E1, E2 and E3 from steam turbines 2 and 3 flow to existing external feedwater heaters 7, 8 and 9 when the extractions are opened. The condenser 4 capacity limit is not a hindrance in such a mode of operation, since steam turbine extractions address and handle the extra steam produced in the HRSG. The existing feedwater pump 6 takes suction from the existing deaerator 8A/27, and feedwater is supplied to the stage of the economizer 13. The additional steam produced in such an arrangement allows the steam turbine generator to run at full capacity.

Additionally, a benefit of the present disclosure is that the cost of the HRSG of FIG. 3 is reduced, since the existing feedwater heater 7, 8 and 9 replace the surface that is required in a conventional supplementary fired HRSG. The HRSG arrangement of the components extends from the inlet IN of duct D of the HRSG and extends down from supplemental burner 10 followed by the superheater 11. Downstream from superheater 11 is a High Pressure (HP) Evaporator 12, and downstream therefrom is a High Pressure (HP) Economizer 13, and downstream therefrom is an Intermediate Pressure (IP) superheater 14, and downstream from that is an Intermediate Pressure (IP) evaporator 15. Downstream from evaporator 15 is a High Pressure/Intermediate Pressure (HP/IP) Economizer 16, then followed by a Low Pressure (LP) superheater 28, then followed by a Low Pressure (LP) Evaporator 17, thence followed by a High Pressure/Intermediate Pressure/Low Pressure (HP/IP/LP) Economizer 18, thence followed by a deaerator evaporator system 22 having a deaerator 24 connected thereto, thence followed by the feedwater heater 26, and thence the stack 25.

In operation the condensate pump 5 feeds water to the feedwater heater 26. Almost no steam is fed through the steam turbine extractions that supply steam to the external feedwater heater 7, 8 and 9. The required deaeration occurs in the integral deaerator 24. Steam for deaeration is supplied by the dedicated deaerator evaporator 22. Suction of the new feedwater pump 21 is taken from the new deaerator 24. Feedwater is supplied to all of the pressure levels and superheated steam from the three superheaters 11, 14 and 28 is fed to the steam turbines 2 and 3. For the operation of the present system, the steam turbine generator G1 can operate at 100% load generating full power. The HRSG of FIG. 3 produces steam at several pressure levels. Steam is fed into the steam turbines 2 and 3 for power generation. Condensate is collected in the condenser 4 and returned to the HRSG.

Those of skilled in the art will recognize that the repowering system shown in FIG. 3 of the present disclosure will have a turndown ratio that is unlimited, meaning that it will operate reliably throughout the entire load range of the combustion turbine 19 and with the supplemental firing of the supplemental burner 10 in the duct D. The turndown ratio is generally understood to refer to the width of the operational range of system shown in FIG. 3 and is the ratio of the maximum output capacity of the system to its minimum output capacity.

Referring now to FIG. 3, the operation of the repowering system RPS of the present disclosure will now be explained. Natural gas is combusted in combustion turbine 19 to directly drive generator G2. The hot exhaust gas expelled from turbine 19 enters duct D of the heat recovery steam generator HRSG. Supplemental heat is added to the exhaust gas by the firing of supplemental burner 10. This hot exhaust stream superheats steam in superheater 11, which supplies superheated steam the steam inlet of steam turbine 2 from the coal-fired plant that is being repowered. After the exhaust stream exits superheater 11, it heats feedwater and produces steam in the high pressure evaporator 12, which in turn feeds steam to superheater 11. The exhaust stream then passes through the high pressure economizer 13, which supplies heated feedwater to the high pressure evaporator 12. The exhaust stream exits evaporator 12 then flows through intermediate pressure superheater 14, which supplies intermediate pressure superheated steam to the steam inlet of steam turbine 3, as shown in FIG. 3. Still further, the exhaust stream flows next through the intermediate pressure evaporator 15, which supplies steam to be superheated by the intermediate pressure superheater 14, as described above. Next, the exhaust stream heats feedwater in the high pressure/intermediate economizer 16, and pump 21 forces the heated feedwater into low pressure evaporator 17. Condensate from condenser 4 is supplied via condensate pump 5 to high pressure, intermediate pressure, low pressure economizer 18 which heats the condensate and supplies to heated condensate to economizer 16. Still referring to FIG. 3, the additional components and the function of the additional components of the system of the present disclosure that are used to repower the coal fired system of FIG. 1 will now be described. It will be noted that a low pressure superheater 28 is interposed between the high pressure/intermediate economizer 16 and the low pressure evaporator 17. As shown in FIG. 3, low pressure superheater 28 is heated by the exhaust flowing through duct D and it supplies low pressure superheated steam to an intermediate inlet port of steam turbine 3 between extractions E2 and E3.

As previously noted, the system of the present disclosure makes use of the regenerative system RGS of the coal fired plant that is being repowered. As shown in FIG. 3, condensate from condenser 4 is supplied via condensate pump 5 to the inlet of feedwater heater 7. In addition, low pressure steam from extraction E3 of steam turbine 3 is supplied to feedwater heater 7 to heat the condensate. In turn, the heated feedwater from feedwater heater 7 is supplied to the inlet of deaerator 8A. Low pressure steam from extraction E3 of steam turbine 3 is supplied to steam drum 27 to heat the feedwater therein. Feedwater from steam drum 27 is supplied via pump 6 to the inlet of feedwater heater 9 and steam from extraction E1 of steam turbine 2 further heats the feedwater in feedwater heater 9 and the heated feedwater is supplied to the high pressure economizer 13.

While not shown in FIGS. 1, 2 and 3, the manifolds connecting the various components are not shown, but such manifold systems would be understood by those skilled in the art from the description herein.

Still referring to FIG. 3, the repowering system RPS of the present disclosure not only reuses the steam turbines 2 and 3 of the coal fired system being repowered, but it also reuses a plurality of extractions (e.g., extractions E1-E3) of the steam turbines 2 and 3. In addition, the repowering system RPS of the present disclosure re-uses the feedwater heating system FHS of the coal fired plant, as shown in FIG. 1. As shown in FIG. 3, condensate from condenser 4 is supplied via condensate pump 5 to the inlet of feedwater heater 7, which is heated by steam from extraction E3. The warmed feedwater from the outlet of feedwater heater 7 is supplied to deaerator 8A to deaerate the feedwater. The deaerated feedwater flows into steam drum 27 and steam from extraction E2 further heats the deaerated feedwater. Deaerator 8A and storage tank 27 comprise feedwater heater 8, which is shown in dotted lines in FIG. 3. Pump 6 draws heated feedwater from storage tank 27 and supplies high pressure feedwater to the inlet of feedwater heater 9. Steam from extraction E1 heats the feedwater in feedwater heater 9, which, in turn, supplies hot feedwater to economizer 13, which further heats the feedwater and supplies it to evaporator 12. In turn, evaporator 12 supplies saturated steam to superheater 11, which superheats the steam and supplies high pressure, superheated steam to the inlet of turbine 2. It will be noted that, in accord with the present disclosure, the following new components include feedwater heater 26, integral deaerator 20 and its steam drum 24, and pump 21 that supplies feedwater to feedwater heater 18.

As various changes could be made in the above constructions methods without departing from the broad scope of the disclosure, it is intended that all matter contained in the above description or shown in the accompanying drawings shall be interpreted as illustrative and not in a limiting sense.

The invention claimed is:

1. A method of repowering a coal fired steam electrical generation system using a natural gas fired turbine for driving a first electrical generator so as to constitute a repowered system (RPS), said coal fired system having a plurality of components that still have useful service life remaining where such components are utilized in the repowered system, said coal fired system having a coal fired boiler configured to be supplied with high temperature feedwater by a feedwater heating system (FHS), said boiler being configured to generate high pressure (HP) superheated steam for powering a high pressure (HP) steam turbine having an output shaft, said HP steam turbine being of the extracting type having at least one extraction, a low pressure (LP) steam turbine of the extracting type having one or more extractions, said LP steam turbine being coupled to said output shaft of said HP steam turbine such that both turbines drive said first electrical generator, a condenser configured to be supplied with condensate from said LP steam turbine, said condenser configured to supply said condensate to a first feedwater heater, said first feedwater heater being configured to preheat said supplied condensate, a second feedwater heater configured to be supplied with heated feedwater from said first feedwater heater, and a third feedwater heater configured to receive heated feedwater from said second feedwater heater with conduits configured to allow fluid flow of steam to said first, second and third feedwater heaters from respective extractions from said HP and LP turbines so as to heat said feedwater, wherein the method of repowering said coal fired system comprises at least the following steps:

a. In the repowered system (RPS), replacing said boiler with a natural gas powered turbine configured to drive a second electrical generator;
 b. Adding a duct (D) having an inlet configured to receive hot exhaust gases from said gas turbine for heating a plurality of components within said duct as the exhaust gases flow through said duct and thus comprising a heat recovery steam generator (HRSG) configured to supply steam to both the HP and LP steam turbines so as to drive the first steam turbine, said duct having an outlet from which said exhaust gasses are discharged to the atmosphere;
 c. Providing a supplemental natural gas burner at the inlet of said duct (D) upstream of said components within said duct configured to heat said exhaust gas from said turbine to a desired temperature;
 d. Providing a high pressure (HP) superheater within said duct (D) immediately downstream of said HP superheater where the latter is configured to be heated by said exhaust gas flowing through said duct (D) for superheating preheated feedwater supplied to said HP superheater by said feedwater heating system (FHS) and configured to supply superheated steam to said HP steam turbine; and
 e. Providing a high pressure (HP) evaporator within said duct (D) downstream from said HP superheater and a high pressure economizer downstream from said HP evaporator where the HP economizer is configured to receive said preheated feedwater from said third feedwater heater, wherein said HP economizer is configured to further heat said preheated feedwater to form high temperature feedwater and configured to supply said high temperature feedwater to said HP evaporator so that such high temperature feedwater can be further heated within said HP evaporator and then supplied to said HP superheater so that the HP superheater can generate HP superheated steam which can be supplied to said HP steam turbine.

2. The method of claim 1 further comprising the steps of:
 a. Providing an intermediate pressure (IP) superheater within said duct (D) downstream of said (HP) economizer configured to be heated by said exhaust gas flowing through said duct (D) and to supply intermediate pressure (IP) steam to said LP steam turbine; and
 b. Providing an intermediate pressure (IP) evaporator downstream of said IP superheater and an intermediate pressure (IP) economizer downstream of said IP evaporator wherein said IP economizer supplies preheated feed water to said IP evaporator and the latter forms said IP steam.

3. The method of claim 2 further comprising the steps of:
 a. Providing a low pressure (LP) superheater within said duct (D) downstream of said IP economizer configured to be heated by said exhaust gas flowing through said duct to supply low pressure (LP) steam from the LP superheater to said LP turbine; and
 b. Providing a low pressure (LP) evaporator within said duct (D) downstream of said LP superheater and a low pressure (LP) economizer downstream of LP pressure evaporator, wherein said LP economizer is supplied with condensate from said condenser to be heated by the exhaust gas flowing through said duct downstream of said LP evaporator so as to form said LP steam which is supplied to said LP superheater.

4. The method of claim 1 further comprising the following steps:
   a. Operating said HRSG and said supplemental burner so as to produce steam at several pressure levels with said supplemental burner such that existing turbine extractions and at least some of the feedwater heaters of the feedwater heating system (FHS) are utilized in the repowered system (RPS) such that the HP and LP steam turbines are capable of producing electricity from the first generator at the full rated megawatt capacity of said turbines.

* * * * *